(12) United States Patent
Osmanovic et al.

(10) Patent No.: US 12,549,915 B2
(45) Date of Patent: Feb. 10, 2026

(54) IN-SYNC DIGITAL WAVEFORM COMPARISON TO DETERMINE PASS/FAIL RESULTS OF A DEVICE UNDER TEST (DUT)

(71) Applicant: ROKU, INC., San Jose, CA (US)

(72) Inventors: Nermin Osmanovic, Austin, TX (US); Deepak Chand Jangid, Cedar Park, TX (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/383,319

(22) Filed: Oct. 24, 2023

(65) Prior Publication Data
US 2024/0163623 A1    May 16, 2024

Related U.S. Application Data

(63) Continuation of application No. 17/409,160, filed on Aug. 23, 2021, now Pat. No. 11,843,921, which is a
(Continued)

(51) Int. Cl.
*H04R 29/00*    (2006.01)
*H04R 3/00*    (2006.01)

(52) U.S. Cl.
CPC ............ *H04R 29/001* (2013.01); *H04R 3/00* (2013.01)

(58) Field of Classification Search
CPC ...... H04R 29/001; H04R 3/00; H04R 29/008; H04L 1/06; H04L 1/242; H04L 1/244;
(Continued)

(56) References Cited

U.S. PATENT DOCUMENTS 3,375,473 A    3/1968   Lucky
3,501,699 A    3/1970   Gagne et al.
(Continued)

FOREIGN PATENT DOCUMENTS

KR       10-1789848 B1    10/2017
WO    WO 2013/0126603 A1    8/2013

OTHER PUBLICATIONS

Extended European Search Report directed to related European Patent Application No. 20888774.5, mailed Feb. 12, 2024; 9 pages.
(Continued)

*Primary Examiner* — Lun-See Lao
(74) *Attorney, Agent, or Firm* — STERNE, KESSLER, GOLDSTEIN & FOX P.L.L.C.

(57) ABSTRACT

Embodiments described herein generally relate to analyzing a signal generated by a device under test (DUT). In particular, the signal generated by the DUT may be compared to a reference signal to determine pass/fail results for the DUT. For example, a method may include: storing, on a computing device, a reference signal from a reference device; receiving a test signal from a device under test (DUT); synchronizing the reference signal and the test signal based on a time-synchronization buffer of each signal; after the synchronization, comparing the test signal and the reference signal to determine a pass or fail result for the DUT; and generating a notification indicating the pass or fail result for the DUT.

18 Claims, 7 Drawing Sheets

Related U.S. Application Data continuation of application No. 16/688,301, filed on Nov. 19, 2019, now Pat. No. 11,102,596.

(58) Field of Classification Search
 CPC ......... G10L 17/00; G10L 17/08; G10L 15/12; G10L 15/22; G10L 17/02; G10L 17/22; G10L 21/06
 USPC .................................. 381/56–59, 60; 700/94
 See application file for complete search history.

(56) References Cited

U.S. PATENT DOCUMENTS

| | | | |
|---|---|---|---|
| 4,583,041 A | 4/1986 | Kimura | |
| 4,799,008 A | 1/1989 | Kannari | |
| 6,114,858 A | 9/2000 | Kasten | |
| 6,188,253 B1 | 2/2001 | Gage et al. | |
| 6,249,533 B1 | 6/2001 | Goishi | |
| 6,999,560 B1 | 2/2006 | Connor et al. | |
| 7,549,099 B2 | 6/2009 | Kantake | |
| 7,856,578 B2 | 12/2010 | Sartschev et al. | |
| 8,300,840 B1* | 10/2012 | Frye | H04R 29/00 381/313 |
| 9,429,632 B2 | 8/2016 | Kawano et al. | |
| 11,102,596 B2 | 8/2021 | Osmanovic et al. | |
| 11,843,921 B2* | 12/2023 | Osmanovic | H04R 3/00 |
| 2009/0150164 A1* | 6/2009 | Wei | G10L 25/48 704/500 |
| 2011/0054827 A1 | 3/2011 | Ishida et al. | |
| 2011/0128044 A1 | 6/2011 | Tamura | |
| 2011/0299691 A1 | 12/2011 | Yoshino | |
| 2014/0091830 A1* | 4/2014 | Ishida | G01R 31/2851 324/762.01 |
| 2018/0270594 A1* | 9/2018 | Little | H04R 29/007 |
| 2021/0105563 A1* | 4/2021 | Marten | H04R 5/04 |
| 2021/0152963 A1 | 5/2021 | Osmanovic et al. | |
| 2021/0385596 A1 | 12/2021 | Osmanovic et al. | |

OTHER PUBLICATIONS

International Search Report and Written Opinion of the International Searching Authority directed to related International Patent Application No. PCT/US2020/061086, mailed Mar. 11, 2021; 8 pages.

* cited by examiner

IN-SYNC DIGITAL WAVEFORM COMPARISON TO DETERMINE PASS/FAIL RESULTS OF A DEVICE UNDER TEST (DUT)

RELATED APPLICATIONS

This application is a continuation and claims benefit of U.S. patent application Ser. No. 17/409,160, filed Aug. 23, 2021 and now allowed, which is a continuation of U.S. patent application Ser. No. 16/688,301, filed Nov. 19, 2019 and allowed as U.S. Pat. No. 11,102,596, the content of which are herein incorporated by reference in their entireties.

TECHNICAL FIELD

Embodiments included herein generally relate to analyzing a signal generated by a device under test (DUT). In particular, the signal generated by the DUT may be compared to a reference signal to determine a pass/fail result for the DUT.

BACKGROUND

After electronic devices, such as a media playback device, are designed and built, these electronic devices are tested to gauge their quality. This testing, however, often requires a human listener to vet the audio quality of the speaker. That is, a human listener is required to play an audio signal over each channel of the electronic device and determine a PASS/FAIL result of for each channel accordingly. Testing electronic devices in this manner is inefficient and costly.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

SUMMARY

Figure 1:
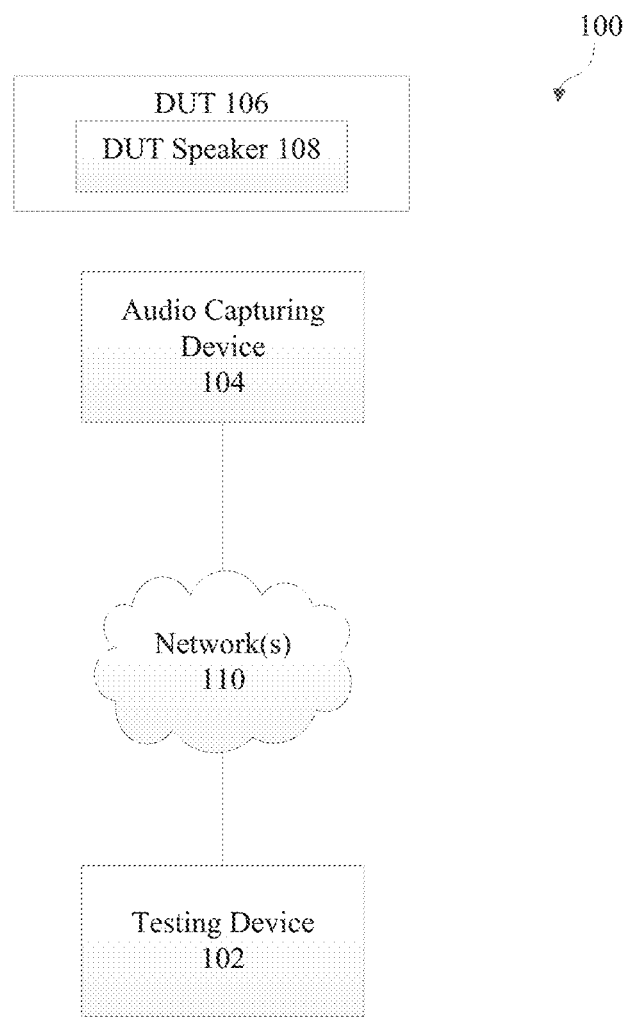
FIG. 1 illustrates a testing environment, according to some embodiments.

Provided herein are system, apparatus, article of manufacture, method and/or computer program product embodiments, and/or combinations and sub-combinations thereof, for measuring and evaluating a signal generated by a device under test (DUT).

In some embodiments, the present disclosure is directed to a method for analyzing a signal generated by a device under test (DUT). The method may include: storing, on a computing device, a reference signal from a reference device; receiving a test signal from a device under test (DUT); synchronizing the reference signal and the test signal based on a time-synchronization buffer of each signal; after the synchronization, comparing the test signal and the reference signal to determine a pass or fail result for the DUT; and generating a notification indicating the pass or fail result for the DUT.

In some embodiments, the present disclosure is directed to a non-transitory, tangible computer-readable device having instructions stored thereon that, when executed by at least one computing device, causes the at least one computing device to perform operations. The operations may include: storing, on a computing device, a reference signal from a reference device; receiving a test signal from a device under test (DUT); synchronizing the reference signal and the test signal based on a time-synchronization buffer of each signal; after the synchronization, comparing the test signal and the reference signal to determine a pass or fail result for the DUT; and generating a notification indicating the pass or fail result for the DUT.

In some embodiments, the present disclosure is directed to a device. The device may include a memory storing instructions for analyzing a signal generated by a device under test (DUT) and a processor configured to execute the instructions. The instructions may cause the processor to perform operations including: storing, on a computing device, a reference signal from a reference device; receiving a test signal from the DUT; synchronizing the reference signal and the test signal based on a time-synchronization buffer of each signal; after the synchronization, comparing the test signal and the reference signal to determine a pass or fail result for the DUT; and generating a notification indicating the pass or fail result for the DUT.

Further features and advantages of the embodiments disclosed herein, as well as the structure and operation of various embodiments, are described in details below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

DETAILED DESCRIPTION OF THE INVENTION

Provided herein are system, method, computer program product and/or device embodiments, and/or combinations thereof, for measuring and evaluating a signal generated by a device under test (DUT).

In some embodiments, a system may be configured to enable linear-time capturing of electric and/or acoustic signals of the DUT using in-sync post-processing to determine a signal quality of the DUT. This may be achieved based on a comparison of a test signal (i.e., the electric and/or acoustic signals) to a reference signal from a reference device. The reference signal may be based on an audio file played back through the reference device and stored in a memory of the system for future use. The audio file may include speech, music, noise, tones, or the like.

Additionally, once a firmware test build is loaded to a system on a chip (SoC) of the DUT, the system may be configured to receive a test signal based on the same audio file and in the same manner as the reference signal. In some embodiments, each of the reference signal and the test signal may include a time-synchronization buffer used to synchronize the signals. After synchronizing the reference signal and the test signal, the system may be configured to compared the test signal to the reference signal to determine pass/fail results for the DUT. In some embodiments, a precision of the signal comparison may be high fidelity, using a mel-frequency cepstral coefficient (MFCC) processing to obtain a metric calculation, e.g., a distance between the two signals. In some embodiments, determining whether the DUT is a PASS or FAIL may be based on the distance between the two signals being less than a threshold value. The processes described herein may be used on each channel of the DUT, e.g., mono, stereo, and surround sound, such that the PASS/FAIL result may be obtained on a channel-by-channel basis.

FIG. 1 illustrates a testing environment for measuring and evaluating a signal generated by a device under test (DUT). Referring to FIG. 1, the testing environment 100 may include a testing device 102, an audio capturing device 104, and a DUT 106 having one or more DUT speakers 108. The testing device 102 and the audio capturing device 104 may be coupled to each other using either a wired connection or a wireless connection, as should be understood by those of ordinary skill in the art. For example, the testing device 102 and the audio capturing device 104 may communicate via a communication network(s) 110. The communication network 110 may include any or all of a wired and/or wireless private network, personal area network (PAN), Local-Area Network (LAN), a Wide-Area Network (WAN), or the Internet. The audio capturing device 104 may any well-known audio capturing device, such as, but not limited to, a microphone, a vibrometer, a laser, or the like. The testing device 102 may be a computing device, such as the computer system 400 illustrated in FIG. 4 discussed in greater detail below. In some embodiments, the processes described herein performed by the testing device 102 may be performed using a processor, e.g., a processor 404 as shown in FIG. 4.

The DUT 106 may be, without limitation, a media player, television, a wireless device, a smartphone, a tablet computer, a laptop/mobile computer, a handheld computer, a server computer, an in-appliance device, Internet of Things (IoT) device, streaming media player, a game console, and/or an audio/video receiver. In some embodiments, the speakers 108 may be different types of audio devices. For example, the speakers 108 may be, without limitation, a combination of one or more different types of speakers, such as full-range drivers, subwoofers, woofers, mid-range drivers, tweeters, sound bars, and/or coaxial drivers, to name just some examples. It should be understood by those of ordinary skill in the arts that each of the speakers 108 may be designed to produce sound at different frequencies. For example, a tweeter may be designed to produce sound at high audio frequencies, e.g., 2,000 Hz to 20,000 Hz, whereas subwoofers and woofers may be designed to produce sound at low audio frequencies, e.g., 40 Hz up to 500 Hz. As such, each speaker 108 may be designed to produce different features of an audio signal, e.g., tweeters may be designed to produce more treble, whereas woofers and sub-woofers may be designed to produce more bass and sub-bass, respectively.

To measure and evaluate a test signal output by the DUT speaker 108, the testing device 102 may be configured to compare the test signal to a reference signal output by a reference speaker. In some embodiments, the reference signal may be an acoustic signal, and the testing device 102 may receive the reference signal via the audio capturing device 104, and while the reference speaker is outputting the reference signal, a user may vet the quality of the reference signal.

Figure 4:
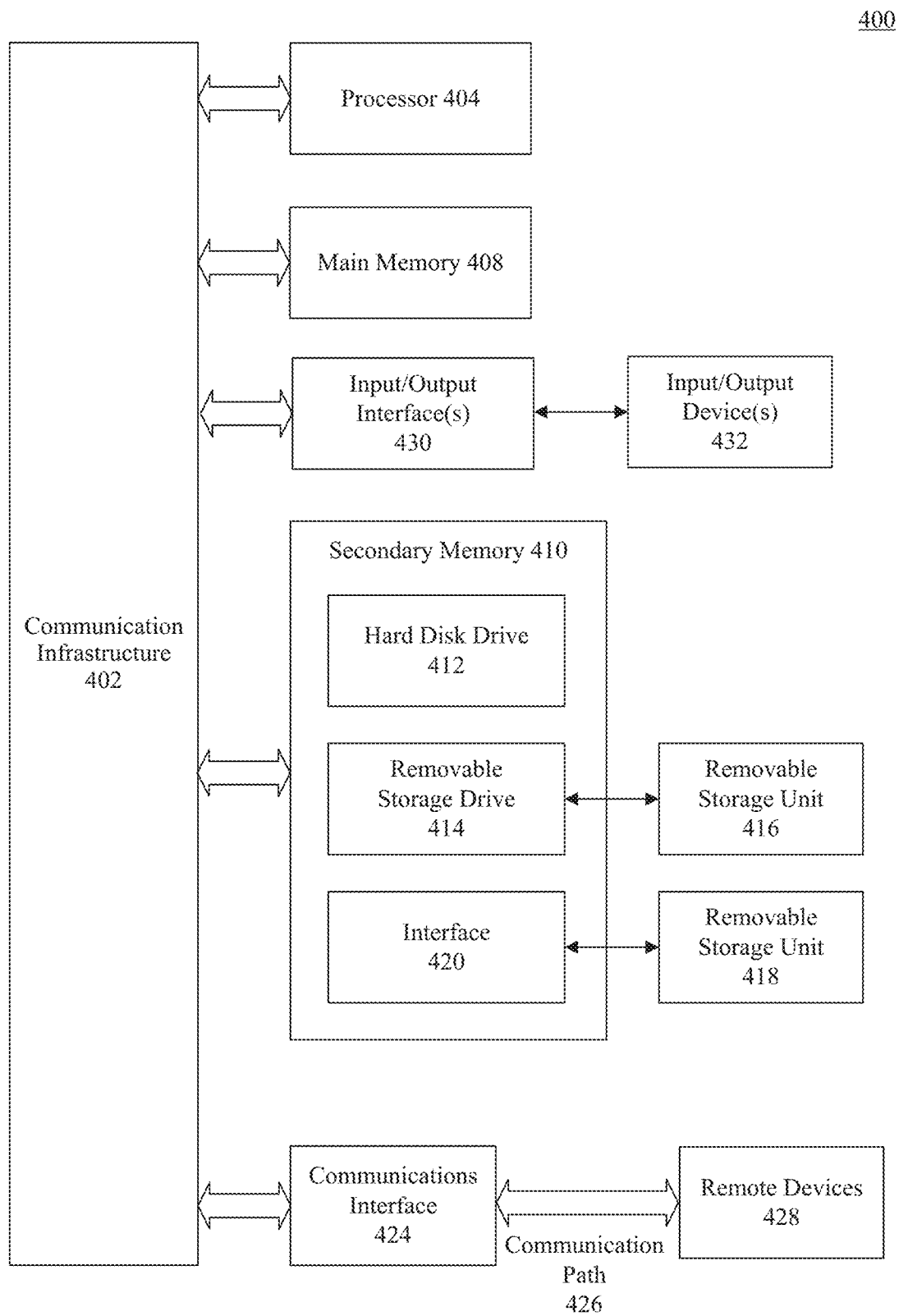
FIG. 4 illustrates an example computer system useful for implementing various embodiments.

The reference signal may be stored as a reference file in a memory, e.g., main memory 406 or secondary memory 408 of FIG. 4. The reference file may be, for example, any uncompressed audio format, such as, but not limited to, .WAV, .AIFF, .AU or .PCM. It should be understood by those of ordinary skill in the arts that these are merely example types of audio files and that other types of audio files are further contemplated in accordance with aspects of the present disclosure. For example, the reference file may also be any format with lossless compression or lossy compression, as should be understood by those of ordinary skill in the arts. In some embodiments, the reference file may be a snippet, e.g., 1 second, of the reference signal. The reference speaker may play back media content having an audio component, such as, but not limited to, a movie, a television show, music, or the like, and the audio capturing device 104 may capture the audio content while placed a distance, e.g., 20 centimeters, from the reference speaker when capturing the reference signal. In further embodiments, the reference signal may be an electrical signal captured at the output pins of the reference device, e.g., positive and negative terminals of transducer, e.g., transducer 212 of FIG. 2, of the reference device, as should be understood by those of ordinary skill in the art. Like the acoustic signal, the measured electrical signal may be stored as a reference file in the memory, e.g., main memory 406 or secondary memory 408 of FIG. 4. In some embodiments, the reference signal may be generated at, for example, −10 dBFS in order to utilize a full dynamic range of the reference speaker.

In some embodiments, once a firmware test build is loaded to a system on a chip (SoC) of the DUT 106, the DUT 106 may playback the same media content as the reference speaker via the DUT speaker 108. Like the reference speaker, a test signal generated by the DUT speaker 108 may be an acoustic signal and/or an electrical signal generated by the DUT speaker 108 may be received and stored in the memory, e.g., main memory 406 or secondary memory 408 of FIG. 4. For example, the audio capturing device 104 may capture the acoustic signal generated by the DUT speaker 108, which may be stored as a test file the memory, e.g., main memory 406 or secondary memory 408 of FIG. 4. In further embodiments, the test signal may be an electrical signal captured at the output pins of the DUT speaker 108, e.g., positive and negative terminals of an output amplifier of the DUT 106, as should be understood by those of ordinary skill in the art.

In some embodiments, the DUT speaker 108 may be tested under the same conditions as the conditions used to capture the reference signal. For example, the DUT speaker 108 may be placed at the same distance from the audio capturing device 104, e.g., 20 centimeters, as the reference speaker, and captured using the same audio capturing device 104 as that used to capture the reference signal. By testing the DUT speaker 108 under the same conditions as the reference speaker, the present disclosure ensures that the measurement and evaluation the acoustic signal generated by the DUT speaker 108 is not influenced by inconsistencies caused by an external environment. For example, placing the audio capturing device 104 at a different distance for the reference speaker and the DUT speaker 108 may affect the signal strength of one of the signals. Similarly, using a different audio capturing devices for capturing each of the signals may introduce differences between the two signals caused by the quality of the audio capturing devices, rather than the speakers themselves.

Figure 7:
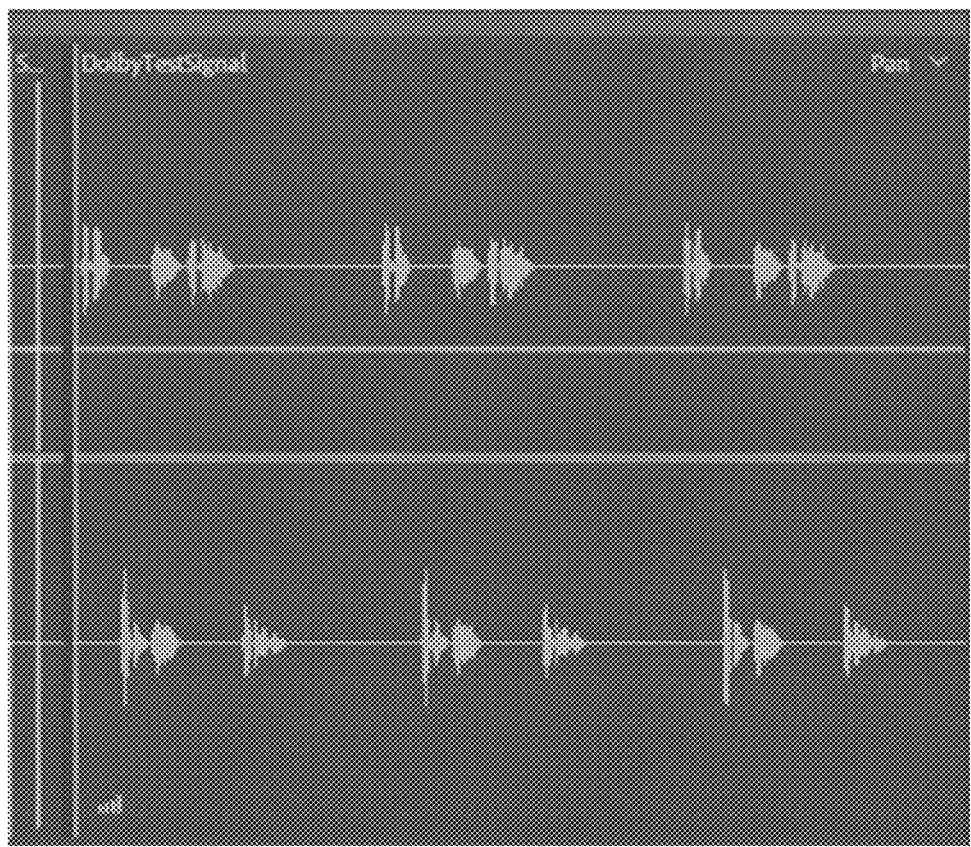
FIG. 7 illustrates example signals having a time-synchronization buffer, according to some embodiments.
Figure 8:
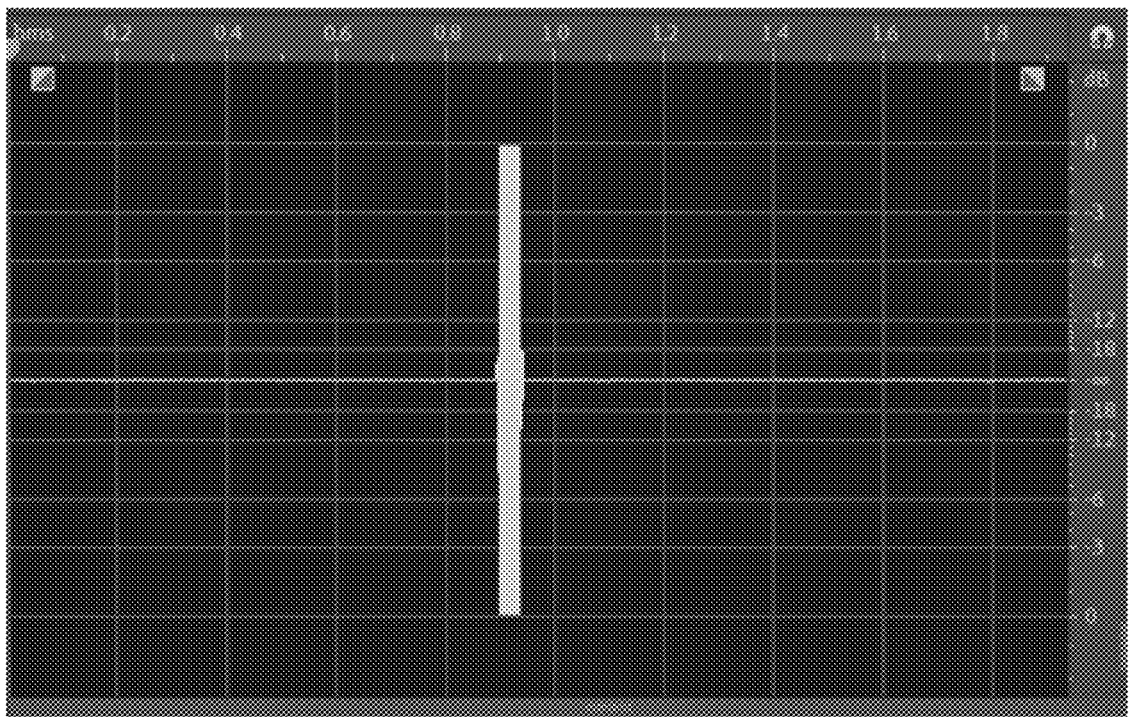
FIGS. 8 and 9 illustrate an example time-synchronization buffer signal, according to some embodiments.
Figure 9:
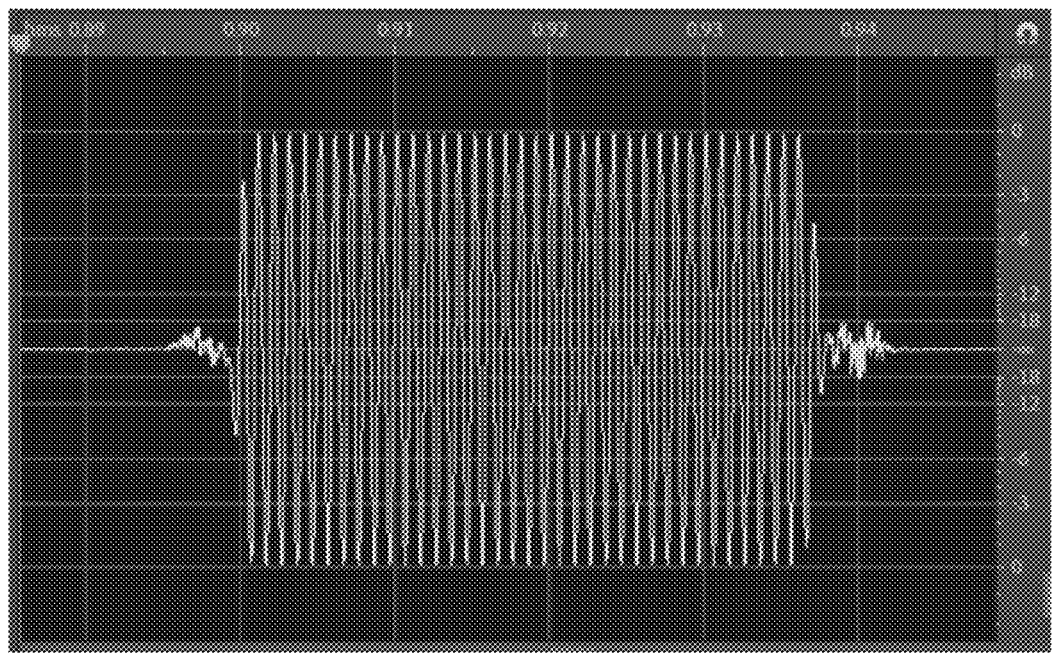

The testing device 102 may then compare the test signal to the reference signal. To accurately compare the test signal and the reference signal, the testing device 102 may synchronize the test signal and the reference signal using a time-synchronization buffer of each signal. For example, FIG. 7 illustrates an example test signal or reference signal having a time-synchronization buffer. The time-synchronization buffer may be, for example, a digital-audio waveform inserted ahead of the test signal and the reference signal. In some embodiments, as illustrated in FIGS. 8 and 9, the time-synchronization buffer may be a 1 kHz sine-wave signal having, for example, a plurality of full periods, e.g., 37 periods. Once captured, the test signal and the reference signal may be synchronized with one another by aligning, for example, an end time of the time-synchronization buffer.

Once synchronized, the testing device 102 may compare the test signal and the reference signal by calculating a distance between the test signal and the reference signal. This may be achieved using an open source library to calculate a mel-frequency cepstral coefficient (MFCC) difference metric, e.g., a spectral difference, as should be understood by those of ordinary skill in the art. For example, the MFCC difference metric may be based on a plurality of vectors determined from the comparison of the test signal and the reference signal. The MFCC difference metric may be implemented using any programming language, procedural, functional, or object-oriented. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, the MFCC difference metric between the test signal and the reference signal may be used to grade the DUT speaker 108. For example, the MFCC difference metric may be compared to a threshold value to determine a pass/fail rating for the DUT speaker 108. For example, when the distance is less than the threshold value, the DUT speaker 108 may receive a pass rating, whereas when the distance is greater than the threshold value, the DUT speaker 108 may receive a fail rating. In some embodiments, the threshold value may be, for example, a distance of 10. In this example, if the MFCC difference metric is between 0 and 10, the rating for the DUT speaker 108 is a PASS, whereas if the MFCC difference metric is higher than 10, the rating for the DUT speaker 108 is a FAIL. It should be understood by those of ordinary skill in the art that this is merely an example threshold value and that any other threshold value may be used in accordance with aspects of the present disclosure.

Figure 5:
FIGS. 5 and 6 illustrate example signals generated by a DUT, according to some embodiments.
Figure 6:
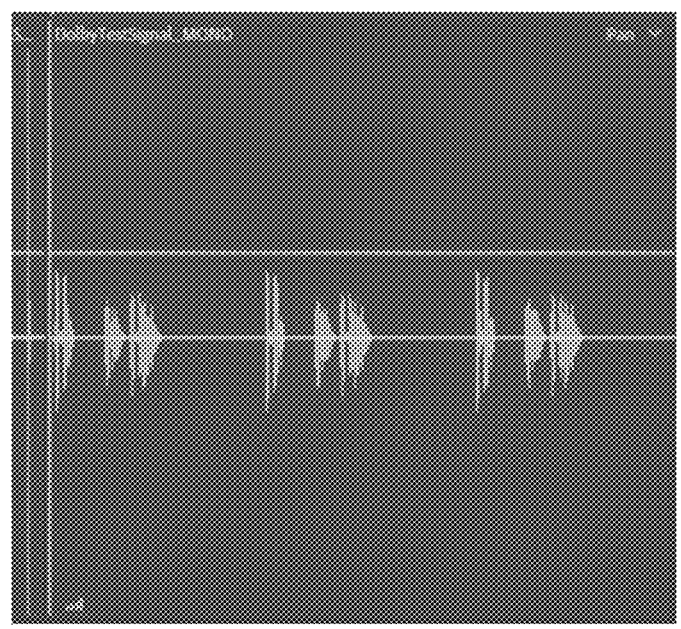

In some embodiments, the DUT speaker 108 may be tested on a channel-by-channel basis. For example, for a stereo speaker, the processes described herein may be performed with respect to the both the left and right channels, as illustrated in FIG. 5. As another example, for a monaural "mono" speaker, the processes described herein may be performed with respect to a single channel, as illustrated in FIG. 6.

The testing device 102 may generate a report indicating the pass/fail rating of the DUT speaker 108. For example, the report may be displayed on a graphical user interface (GUI) configured, such that when the analysis of the DUT speaker 108 is performed, a notification may be generated on the GUI indicating the results of the analysis. When the DUT speaker 108 fails, the firmware of the DUT 106 may be updated, as should be understood by those of ordinary skill in the art.

Figure 2:
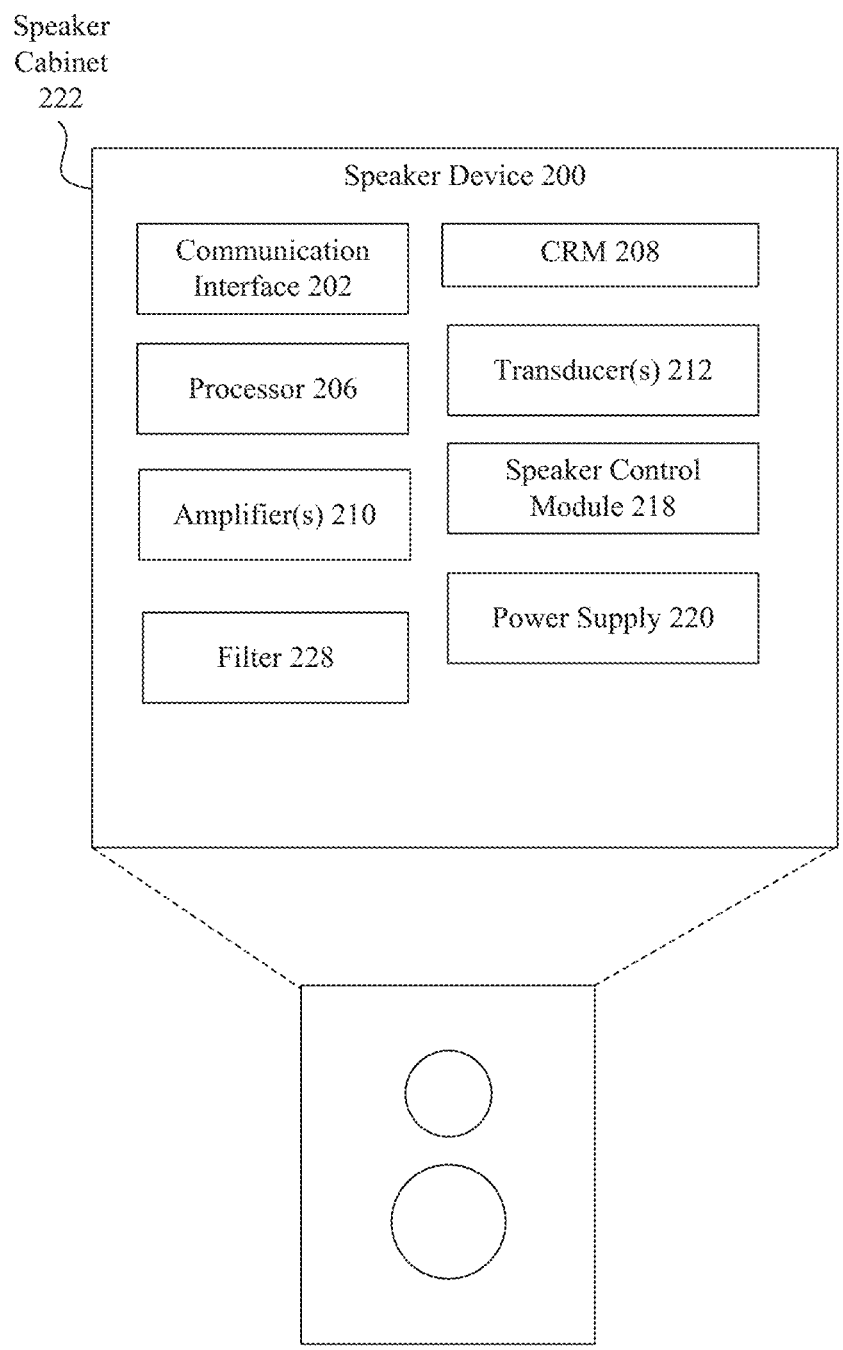
FIG. 2 illustrates a speaker, according to some embodiments.

FIG. 2 is a block diagram of an example embodiment of a speaker 200, e.g., the speaker 108 of FIG. 1. The speaker 200 may comprise a processor 206, a non-transitory, tangible computer readable memory (CRM) 208, one or more amplifiers 210, a speaker control module 218 for receiving user commands via one or more controls (e.g., buttons and/or a remote control interface), a power supply 220, or more filters 228 (e.g., the filters 120), transducers 212, and a speaker cabinet 222 to enclose components of the speaker 200.

The communication interface(s) 202 may include one or more interfaces and hardware components for enabling communication with various other devices. For example, communication interface(s) 202 facilitate communication through one or more of the Internet, cellular networks, and wireless networks (e.g., Wi-Fi, cellular). The non-transitory, tangible computer readable memory (CRM) 208 may be used to store any number of functional components that are executable by the processor 206. In many implementations, these functional components comprise instructions or programs that are executable by the processors and that, when executed, specifically configure the one or more processors 206 to perform the actions attributed above to the speakers (e.g., the speaker 108). In addition, the non-transitory, tangible computer readable memory 208 stores data used for performing the operations described herein.

The processor 206 may select which portion of the content will be processed. In some embodiments, in a stereo mode, for example, the speaker 200 processes either the left stereophonic channel or right stereophonic channel. In a surround sound mode, the speaker 200 selects a signal to process from among the multiple channels. The selection of the playback mode (e.g., stereo mode, mono mode, surround sound mode) may be performed via the speaker control module 218. In some embodiments, the filters 228 modify the content to determine the frequencies of the content that are reproduced by the speaker 200 in accordance with the filter settings 232. This may be done by performing crossover, phase matching, and time alignment filtering function in a digital implementation. In some examples, the filters 228 may include FIR or IIR filters that implement a crossover filtering technique.

The output of the processor 206 may be a set of filtered digital audio signals, one for each of the transducers 212. These signals may be directed to the inputs of digital amplifiers, which generate high power output signals that drive the speaker transducers 212 to produce an optimal and/or improved reproduction of the content in concert with one or more other speakers having different performance capabilities in accordance with the present invention.

Figure 3:
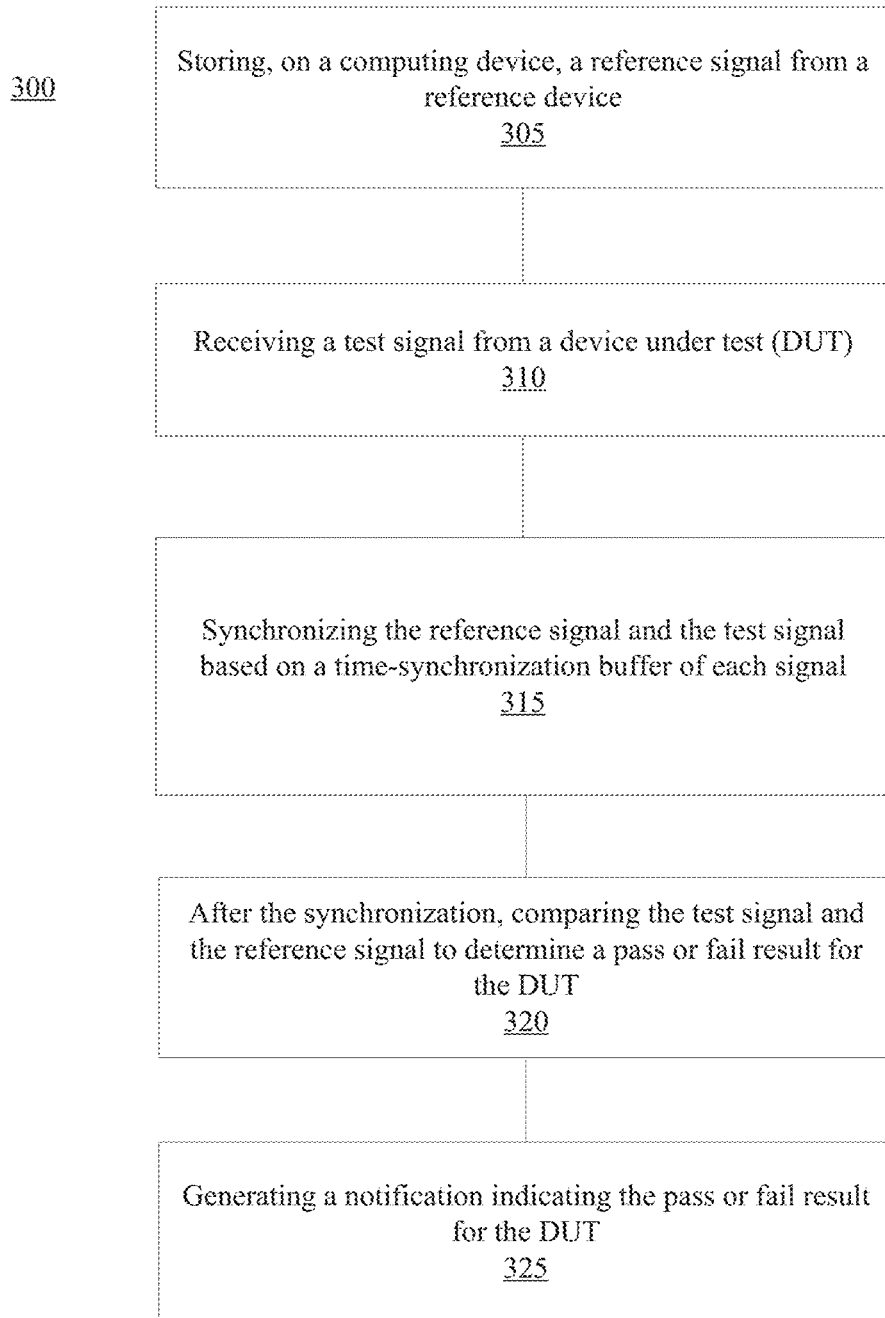
FIG. 3 illustrates a flowchart for measuring and evaluating a signal generated by a device under test (DUT), according to some embodiments.

FIG. 3 illustrates an example method for measuring and evaluating a signal generated by a device under test (DUT).

For example, at 305, a testing device (e.g., testing device 102 of FIG. 1) may store in a memory, e.g., main memory 406 or secondary memory 408 of FIG. 4, a reference signal from a reference device.

At 310, the testing device (e.g., testing device 102 of FIG. 1) may receiving a test signal from a device under test (DUT), e.g., DUT 106 of FIG. 1.

At 315, the testing device (e.g., testing device 102 of FIG. 1) may synchronize the reference signal and the test signal based on a time-synchronization buffer of each signal.

At 320, after the synchronization, the testing device (e.g., testing device 102 of FIG. 1) may compare the test signal and the reference signal to determine a pass or fail result for the DUT.

At 325, the testing device (e.g., testing device 102 of FIG. 1) may generate a notification indicating the pass or fail result for the DUT.

Example Computer System

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 402.

Computer system 400 also includes user input/output device(s) 432, such as monitors, keyboards, pointing devices, etc., which communicate with communication infrastructure 402 through user input/output interface(s) 430.

Computer system 400 also includes a main or primary memory 406, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 and interface 420 may interact with a removable storage units 416, 418, respectively. Removable storage units 416, 418 includes a computer usable or readable storage device having stored thereon computer software (control logic) and/or data. Removable storage units 416, 418 may be a floppy disk, magnetic tape, compact disk, DVD, optical storage disk, and/any other computer data storage device. Removable storage drive 414 reads from and/or writes to removable storage unit 416 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage drive 414 and an interface 420. Examples of the removable storage drive 414 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 416, 418, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    storing, by at least one computer processor, one or more reference signals output by a reference speaker of a reference device, wherein the reference speaker includes one or more channels corresponding to the one or more reference signals; and
    for each channel of the one or more channels:
        receiving a test signal associated with a respective channel output by a speaker of a device under test (DUT);
        performing a time-based synchronization between a reference signal of the one or more reference signals that is associated with the respective channel and the test signal based on an insertion of a digital-audio waveform ahead of both the reference signal and the test signal;
        calculating a spectral distance between the test signal and the reference signal after the test signal and the reference signal have been synchronized; and
        comparing the spectral distance to a threshold value to determine a pass or fail result for the respective channel.

2. The computer-implemented method of claim 1, wherein the test signal is output by the speaker of the DUT when the DUT plays media content played by the reference device.

3. The computer-implemented method of claim 1, wherein the test signal is output by the speaker of the DUT under a same condition as a condition used to output the reference signal by the reference speaker.

4. The computer-implemented method of claim 1, wherein the calculating the spectral distance comprises calculating a mel-frequency cepstral coefficient (MFCC) difference metric based on a plurality of vectors determined by comparing the test signal and the reference signal.

5. The computer-implemented method of claim 1, wherein the speaker of the DUT is a stereo speaker, and wherein the one or more channels comprise a left channel and a right channel.

6. The computer-implemented method of claim 1, wherein the reference signal comprises one of an electrical signal and an acoustic signal.

7. The computer-implemented method of claim 1, wherein the speaker of the DUT includes one of a full-range driver, a subwoofer, a woofer, a mid-range driver, a tweeter, a sound bar, and a coaxial driver.

8. A non-transitory, tangible computer-readable medium having instructions stored thereon that, when executed by at least a computing device, cause at least the computing device to perform operations comprising:
    storing one or more reference signals output by a reference speaker of a reference device, wherein the reference speaker includes one or more channels corresponding to the one or more reference signal; and
    for each channel of the one or more channels:
        receiving a test signal associated with a respective channel output by a speaker of a device under test (DUT);
        performing a time-based synchronization between a reference signal of the one or more reference signals that is associated with the respective channel and the test signal based on an insertion of a digital-audio waveform ahead of both the reference signal and the test signal;
        calculating a spectral distance between the test signal and the reference signal after the test signal and the reference signal have been synchronized; and
        comparing the spectral distance to a threshold value to determine a pass or fail result for the respective channel.

9. The non-transitory, tangible computer-readable medium of claim 8, wherein the test signal is output by the speaker of the DUT when the DUT plays media content played by the reference device.

10. The non-transitory, tangible computer-readable medium of claim 8, wherein the test signal is output by the speaker of the DUT under a same condition as a condition used to output the reference signal by the reference speaker.

11. The non-transitory, tangible computer-readable medium of claim 8, wherein the calculating the spectral distance comprises calculating a mel-frequency cepstral coefficient (MFCC) difference metric based on a plurality of vectors determined by comparing the test signal and the reference signal.

12. The non-transitory, tangible computer-readable medium of claim 8, wherein the speaker of the DUT is a stereo speaker, and wherein the one or more channels comprise a left channel and a right channel.

13. The non-transitory, tangible computer-readable medium of claim 8, wherein the reference signal comprises one of an electrical signal and an acoustic signal.

14. A device, comprising:
    a memory storing one or more reference signals output by a reference speaker of a reference device, wherein the reference speaker includes one or more channels corresponding to the one or more reference signals; and
    a processor coupled to the memory, and configured to perform operations comprising:
        for each channel of the one or more channels:
            receiving a test signal associated with a respective channel output by a speaker of a device under test (DUT);
            performing a time-based synchronization between a reference signal of the one or more reference signals that is associated with the respective channel and the test signal based on an insertion of a digital-audio waveform ahead of both the reference signal and the test signal;
            calculating a spectral distance between the test signal and the reference signal after the test signal and the reference signal have been synchronized; and
            comparing the spectral distance to a threshold value to determine a pass or fail result for the respective channel.

15. The device of claim 14, wherein the speaker of the DUT is a stereo speaker, and wherein the one or more channels comprise a left channel and a right channel.

16. The device of claim 14, wherein the reference signal comprises one of an electrical signal and an acoustic signal.

17. The device of claim 14, wherein the test signal is output by the speaker of the DUT when the DUT plays media content played by the reference device.

18. The device of claim 14, wherein the test signal is output by the speaker of the DUT under a same condition as a condition used to output the reference signal by the reference speaker.

\* \* \* \* \*